April 9, 1940.   D. M. ACKERMAN   2,196,284
GUM MASSAGING IMPLEMENT
Filed June 2, 1938

Inventor
Dolletta M. Ackerman,
By [signature]
Attorney

Patented Apr. 9, 1940

2,196,284

UNITED STATES PATENT OFFICE 2,196,284

GUM MASSAGING IMPLEMENT

Dolletta M. Ackerman, Los Angeles, Calif.

Application June 2, 1938, Serial No. 211,415

1 Claim. (Cl. 128—62)

This invention relates to gum massaging implements and more particularly to devices for the care and treatment of the gums and teeth and the invention has for an object to provide a convenient hand operated implement combining a tooth brush and a preferably rubber tooth-cleaning and massaging device.

With the above and other objects in view, including the provision of a device of the general nature above outlined which will be exceedingly simple and inexpensive in construction and organization, which will be sanitary, highly efficient, and generally satisfactory in use, the invention consists in the novel and useful provision, formation, combination and association of parts members and features, all as hereinafter described, shown in the drawing, and finally pointed out in claim.

In the drawing.

Like parts in the several figures of the drawing are designated by like reference characters.

Figure 1:
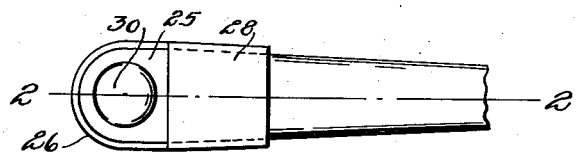
Figure 1 is a top plan view of the invention, the handle being broken off.
Figure 2:
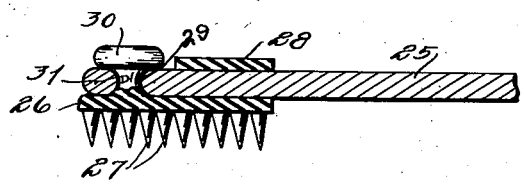
Figure 2 is a section on the line 2—2 of Fig. 1.
Figure 3:
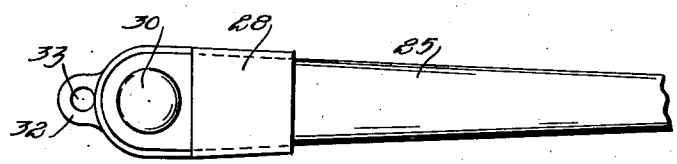
Figure 3 is a view similar to Fig. 1, but showing a slight modification.

In Figures 1, 2 and 3 I have shown an attachment formed of resilient rubber or the like and including a sleeve or open-ended portion 28 slipped onto the tooth brush handle 25 to form a holding means. This holding means is supplemented by a post or neck 29 which passes through the handle aperture 31, a button or head 30 on the neck securely binding the parts. This neck springs from the plate or base 26 from which the prongs 27 extend. In Figure 3 I have shown an integral loop 32 forming an eye at the extreme tip of the device for engagement with a supporting hook.

Figure 4:
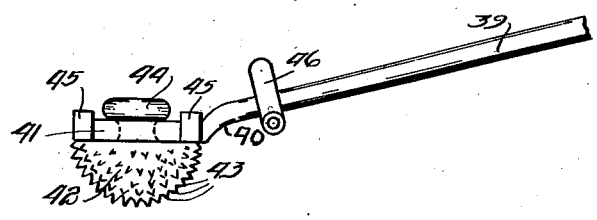
Figure 4 is a side elevation of a further modified form of the invention.

An angled tooth brush handle is shown at 39 in Figure 4. This handle is suitably bent at 40 to provide a properly related end portion at 41. To this end 41 a hemispherical resilient element 42 is attached by means of the neck and head 44 which is supplemented by a pair of bands 45 passed over the handle. Flexible prongs are shown at 43 and a slidable loop is shown at 46 for engagement by a hook.

I do not desire to be understood as limiting myself to the specific disclosure herein, but reserve the right in practicing the invention, to vary the same both with respect to the configuration of the massaging element and the formation of its working surface, and all without departing from the spirit of the invention and the terms of the following claim.

Having thus disclosed my invention, I claim and desire to secure by Letters Patent:

A gum massaging implement including a shank having an opening at one end, a flat elongated elastic member having a sleeve at one end and a headed button adjacent the other end, said sleeve fitting on said shank and said button extending through the opening in the shank, whereby the head of the button lies on one side of the shank and the elongated member lies on the opposite side, and massaging prongs carried by the elongated member and projecting away from the shank.

DOLLETTA M. ACKERMAN.